United States Patent
Wen et al.

(10) Patent No.: US 11,158,044 B2
(45) Date of Patent: Oct. 26, 2021

(54) BATTERY DETECTION METHOD AND DEVICE

(71) Applicant: BEIJING BAIDU NETCOM SCIENCE AND TECHNOLOGY CO., LTD., Beijing (CN)

(72) Inventors: Yawei Wen, Beijing (CN); Jiabing Leng, Beijing (CN); Minghao Liu, Beijing (CN); Huihui Xiao, Beijing (CN); Jiangliang Guo, Beijing (CN); Xu Li, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 15 days.

(21) Appl. No.: 16/650,279

(22) PCT Filed: Jun. 27, 2019

(86) PCT No.: PCT/CN2019/093383
§ 371 (c)(1),
(2) Date: Mar. 24, 2020

(87) PCT Pub. No.: WO2020/042741
PCT Pub. Date: Mar. 5, 2020

(65) Prior Publication Data
US 2021/0209739 A1    Jul. 8, 2021

(30) Foreign Application Priority Data

Aug. 27, 2018  (CN) .......................... 201810980598.3

(51) Int. Cl.
*G06T 7/00*    (2017.01)

(52) U.S. Cl.
CPC .... *G06T 7/001* (2013.01); *G06T 2207/20081* (2013.01); *G06T 2207/20084* (2013.01); *G06T 2207/30108* (2013.01)

(58) Field of Classification Search
CPC ........ H02J 7/00; H02J 7/14; H02J 7/32; H02J 9/06; H01M 10/42; H01M 10/44;
(Continued)

(56) References Cited

U.S. PATENT DOCUMENTS 4,377,786 A  *  3/1983  Paul et al.
6,266,138 B1    7/2001  Keshavmurthy
(Continued)

FOREIGN PATENT DOCUMENTS

CN    101539533    *  9/2009
CN    101539533 A     9/2009
(Continued)

OTHER PUBLICATIONS

English translation of Office Action for CN application No. 201810980598.3, dated Dec. 10, 2020, 21 pages.
(Continued)

*Primary Examiner* — Quan M Hua
(74) *Attorney, Agent, or Firm* — Fay Sharpe LLP (57) ABSTRACT

The present disclosure provides a battery detection method and a battery detection device. The method includes: obtaining a picture of each battery on a battery production line, and obtaining a corresponding production node; inputting the picture into a preset defect detection model, and obtaining a detection result output by the defect detection model, and when the detection result denotes that there is the defect on the picture, sending a control instruction to a control device of the production node corresponding to the picture, to cause the control device to shunt the battery corresponding to the picture having the defect based on the control instruction.

(Continued)

The detection result includes whether there is a defect, a defect type, and a defect position.

15 Claims, 3 Drawing Sheets

(58) Field of Classification Search
CPC ...... H01M 10/48; H01M 10/46; H01M 10/04; H01M 10/0525; H01M 4/131; H01M 4/38; G01R 31/36; G01R 31/08; G01R 15/12; G01R 19/165; G01R 31/00; G01R 31/34; G01R 31/42; G06N 5/04; G06N 3/08; G06N 3/04; G06N 7/00; G06N 99/00; G06N 5/02; G06N 20/00; G06N 20/10; G06K 9/62; G06K 9/00; G06F 21/62; G06F 7/14; G06F 9/50; G06F 16/23; G06F 16/2455; G06F 16/28; G06F 7/00; G06F 17/16
See application file for complete search history.

(56) References Cited

U.S. PATENT DOCUMENTS

| | | | | |
|---|---|---|---|---|
| 2012/0191631 | A1* | 7/2012 | Breckenridge | G06N 20/00 706/12 |
| 2019/0148682 | A1* | 5/2019 | Ojiri | H01M 50/10 429/163 |

FOREIGN PATENT DOCUMENTS

| | | | |
|---|---|---|---|
| CN | 101546557 | A | 9/2009 |
| CN | 103020642 | A | 4/2013 |
| CN | 103502899 | A | 1/2014 |
| CN | 203705352 | U | 7/2014 |
| CN | 204241383 | U | 4/2015 |
| CN | 105205479 | * | 12/2015 |
| CN | 105279382 | A | 1/2016 |
| CN | 204936176 | U | 1/2016 |
| CN | 105352967 | A | 2/2016 |
| CN | 106568783 | A | 4/2017 |
| CN | 206107748 | U | 4/2017 |
| CN | 106814088 | A | 6/2017 |
| CN | 107192759 | A | 9/2017 |
| CN | 108090897 | A | 5/2018 |
| CN | 108154508 | A | 6/2018 |
| CN | 108230317 | A | 6/2018 |
| CN | 108257121 | A | 7/2018 |
| CN | 108320278 | * | 7/2018 |
| CN | 108320278 | A | 7/2018 |
| JP | 2006243923 | A | 9/2006 |
| JP | 2014153906 | A | 8/2014 |
| JP | 2017138808 | A | 8/2017 |

OTHER PUBLICATIONS

Office Action for CN application No. 201810980598.3, dated Dec. 10, 2020, 12 pages.

Office Action for Chinese Application No. 201810980598.3, 10 pages (English Translation).

International Search Report for PCT Application No. PCT/CN/ 2019093383, 16 pages (English Translation).

Office Action for JP application No. 2020-519278, dated May 18, 2021, 4 pages.

English translation of Office Action for JP application No. 2020- 519278, dated May 18, 2021, 4 pages.

* cited by examiner

BATTERY DETECTION METHOD AND DEVICE

CROSS-REFERENCE TO RELATED APPLICATIONS

This application is a US national application of International Application No. PCT/CN 2019/093383, filed on Jun. 27, 2019, which is based on and claims priority to Chinese Patent Application No. 201810980598.3, filed on Aug. 27, 2018, the entire contents of which are incorporated herein by reference.

TECHNICAL FIELD

The present disclosure relates to the field of data processing technologies, and more particularly, to a battery detection method, and a battery detection device.

BACKGROUND

There are currently quality detection methods for single crystalline silicon solar cells. The first quality detection method is manual quality detection, the single crystalline silicon solar cells on the production line are manually observed to determine whether there are defects. The first method has high labor cost and poor efficiency.

SUMMARY

Embodiments of a first aspect of the present disclosure provide a battery detection method, the method includes: obtaining a picture of each battery on a battery production line, and obtaining a corresponding production node; inputting the picture into a preset defect detection model, and obtaining a detection result output by the defect detection model, when the detection result denotes that there is the defect on the picture, sending a control instruction to a control device of the production node corresponding to the picture, to cause the control device to shunt the battery corresponding to the picture having the defect based on the control instruction. The detection result includes whether there is a defect, a defect type, and a defect position.

E Embodiments of the present disclosure provide a battery detection device. The device a memory, a processor, and a computer program stored on the memory and executable by the processor. When the computer program is executed by the processor, causes the processor to implement the battery detection method as described above.

Embodiments of the present disclosure provide a non-transitory computer-readable storage medium having stored thereon a computer program that, when executed by a processor, causes the processor to implement the battery detection method as described above.

Embodiments of the present disclosure provide a computer program product having stored thereon an instruction that, when executed by a processor, causes the processor to implement the battery detection method as described above.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure.

The second quality detection method is machine-assisted manual quality detection, the machine collects pictures of the single crystalline silicon solar cells on the production line, and the quality detection system identifies whether there are defects in the pictures by combining with defects defined in advance. In the second method, the defects defined in the quality detection system are fixed and difficult to update, only simple defects can be identified, and it is difficult to identify complex defects, which reduces the quality detection efficiency.

The battery detection method and device according to embodiments of the present disclosure will be described below with reference to the accompanying drawings.

Figure 1:
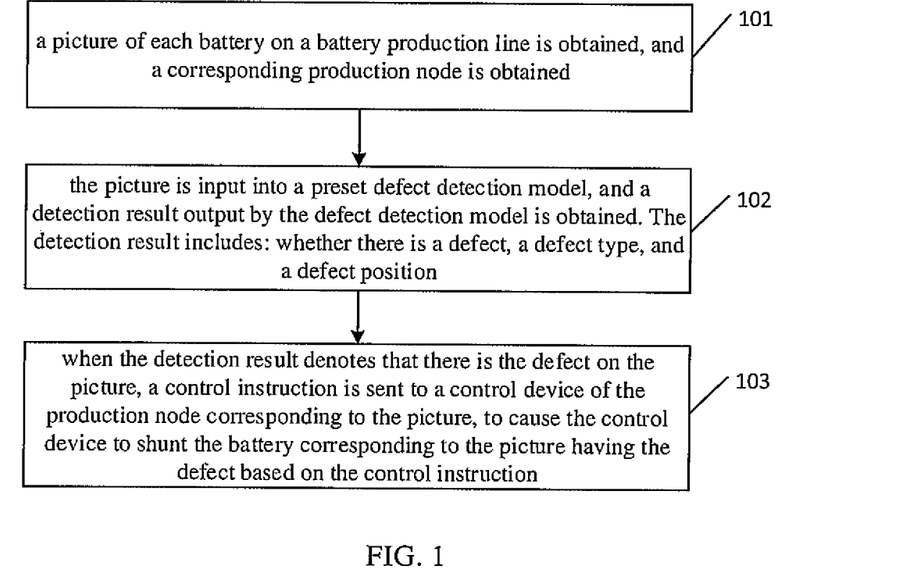
FIG. 1 is a flowchart of a battery detection method according to some embodiments of the present disclosure.

FIG. 1 is a flowchart of a battery detection method according to some embodiments of the present disclosure, as shown in FIG. 1, the method may include the following acts.

At block 101, a picture of each battery on a battery production line is obtained, and a corresponding production node is obtained.

The execution subject of the battery detection method according to the present disclosure may be a battery detection device. The battery detection device may be a hardware device such as a terminal device and a server, or battery detection device may also be software installed on the hardware device. In some embodiments, the battery may be a single crystalline silicon solar cell. The detection for the battery may be the detection for some components of the battery, such as the detection for the electroluminescent (EL) component of the battery.

In the embodiment, the picture of the battery may be obtained by photographing the battery of each production node on the battery production line. Cameras may be set at multiple positions on each production node of the battery production line, to take the pictures of the batteries of each production node, and pictures of the batteries can be collected. The camera can be a fixed camera, or a mobile camera.

At block 102, the picture is input into a preset defect detection model, and a detection result output by the defect detection model is obtained. The detection result includes: whether there is a defect, a defect type, and a defect position.

In the embodiment, the defect type may be, for example, cracks, debris, empty solder, or broken gate. The defect detection model may be a deep neural network model, and the structure of the defect detection model may be determined according to the mask RCNN (Region Convolutional Neural Network) algorithm. In the embodiment, the structure of the defect detection model may include a convolution layer, a pooling layer, a fully connected layer, and the like. The convolution layer is configured to extract features in the picture, and generate a feature map corresponding to the picture. The pooling layer is configured to reduce the dimension of the feature map, remove non-main features in the feature map, and retain the main features in the feature map, and has high robustness to deformation, blurring, and illumination changes of the pictures on the production line. The fully connected layer is a network branch based on instance segmentation. The branch is based on the feature map, and configured to restore the feature map to an original image size by using an algorithm based on binary interpolation. Each pixel is predicted to obtain its instance such as color, grayscale and other information, and then each object or component in the picture is obtained, and the object or component is compared with the object or component under normal conditions, so as to determine whether there is a defect in the picture, and determine the type and location of the defect when there is the defect.

Further, on the basis of the above embodiments, there may be a plurality of defect detection models, which are respectively set on different servers. Correspondingly, the process of performing block 102 by the battery detection device may include acts of: obtaining a load of each of the plurality of defect detection models, selecting, from the plurality of defect detection models, a first defect detection model whose load satisfies a preset load condition; and inputting the picture into the first defect detection model to obtain the detection result output by the first defect detection model.

In the embodiment, compared with a single defect detection model, the setting of the plurality of defect detection models and the selecting of first defect detection model whose load satisfies the preset load condition from each of the plurality of defect detection models can reduce the workload of the defect detection model, and improve the detection speed of the pictures, thereby improving battery detection efficiency.

At block 103, when the detection result denotes that there is the defect on the picture, a control instruction is sent to a control device of the production node corresponding to the picture, to cause the control device to shunt the battery corresponding to the picture having the defect based on the control instruction.

In the embodiment, the control device may be, for example, a conveyor belt, a robot arm, or a controller corresponding to the conveyor belt, the robot arm, or the like. In addition, in order to ensure the shunting effect of the battery corresponding to the picture having the defect, when the detection result denotes that there is the defect on the picture, a prompt message may be sent to the management personnel to prompt the management personnel to manually shunt the battery corresponding to the picture having the defect.

In addition, it should be noted that, after block 103, the method may further include: generating a log according to the detection result and the shunt result, and storing the log for the management personnel to view. The log may include pictures of each battery, picture collection time, detection results, and shunt results.

With the battery detection method according to embodiments of the present disclosure, the picture of each battery on the battery production line is obtained, the corresponding production node is obtained, the picture is input into the preset defect detection model, the detection result output by the defect detection model is obtained, the detection result includes whether there is the defect, the defect type and the defect position, and when the detection result denotes that there is the defect on the picture, the control instruction is sent to the control device of the production node corresponding to the picture, to cause the control device to shunt the battery corresponding to the picture having the defect based on the control instruction. Thus, by combining the defect detection model to identify the battery defects, both simple defects and complex defects can be identified, and the defect detection model is retrained based on the detection result, such that the defect detection model can identify the most recent defects, and the battery is automatically shunted according to the identified defects without manual participation, the efficiency and accuracy of battery detection are improved, and labor costs are reduced.

Figure 2:
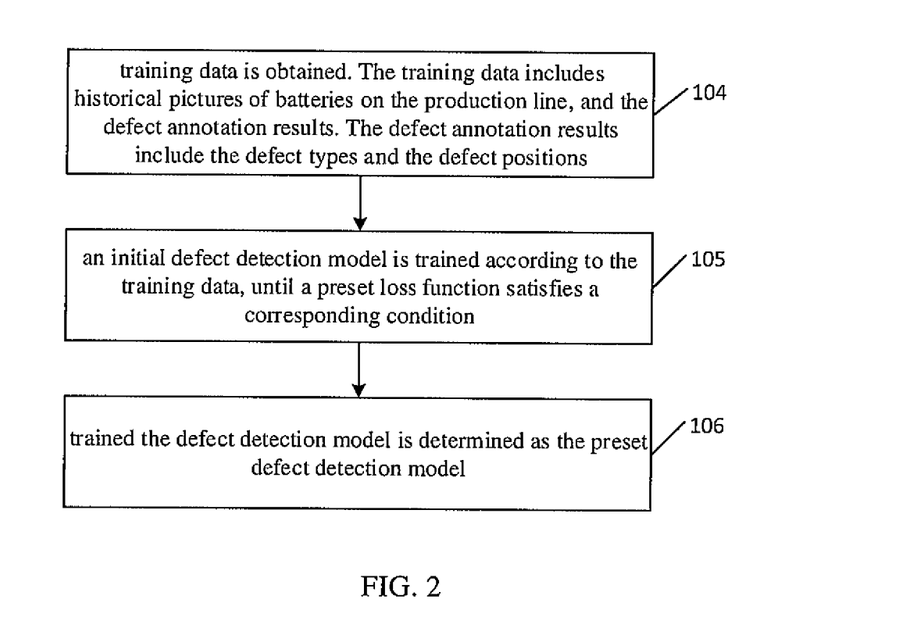
FIG. 2 is a flowchart of a battery detection method according to some other embodiments of the present disclosure.

FIG. 2 is a flowchart of a battery detection method according to some other embodiments of the present disclosure, as shown in FIG. 2, on the basis of the embodiments shown in FIG. 1, before block 102, the battery detection method may further include the following acts.

At block 104, training data is obtained. The training data includes historical pictures of batteries on the production line, and the defect annotation results. The defect annotation results include the defect types and the defect positions.

In the embodiment, the historical pictures may refer to historical pictures of the battery taken on the production line before the current time. The defect annotation results corresponding to the historical pictures may be results obtained by manually annotating the defect types and defect positions of the historical pictures.

At block 105, an initial defect detection model is trained according to the training data, until a preset loss function satisfies a corresponding condition.

In the embodiment, the preset loss function may be determined according to the loss function of the convolution layer, the pooling layer, the fully connected layer, and the like in the defect detection model. The condition corresponding to the loss function may be a threshold that the loss function needs to satisfy. The loss function satisfying the corresponding condition denotes that the value of the loss function is less than the threshold.

At block 106, trained the defect detection model is determined as the preset defect detection model.

Further, on the basis of the above embodiments, after block 102, the method may further include acts of: reviewing the detection result corresponding to the picture, adding the picture and the detection result to the training data to obtain updated training data after the detection result passes the review; and retraining the defect detection model based on the updated training data.

In the embodiment, by retraining the defect detection model according to the picture and the detection result, the detection accuracy of the defect detection model can be improved, and when there is a new defect in the detection result, the defect detection model can also detect the new defect in the picture.

Further, based on the above embodiments, before the defect detection model is retrained based on the updated training data, the method further includes acts of obtaining a number of pictures and corresponding detection results added into the updated training data. Correspondingly, retraining the defect detection model according to the updated training data includes: retraining the defect detection model according to the updated training data when the number is greater than a preset number threshold.

In the embodiment, in order to reduce the training times of the defect detection model, and avoid repeated training, re-training of the defect detection model may be started when the number of pictures and corresponding detection results newly added into the training data is greater than the preset number threshold.

Figure 3:
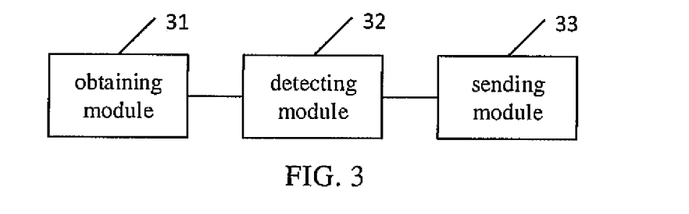
FIG. 3 is a block diagram of a battery detection device according to some other embodiments of the present disclosure.

FIG. 3 is a block diagram of a battery detection device according to some other embodiments of the present disclosure. As shown in FIG. 3, the battery detection device includes an obtaining module 31, a detecting module 32, and a sending module 33.

The obtaining module 31 is configured to obtain a picture of each battery on a battery production line, and obtain a corresponding production node. The detecting module 32 is configured to input the picture into a preset defect detection model, and obtain a detection result output by the defect detection model. The detection result including: whether there is a defect, a defect type, and a defect position. The sending module 33 is configured to, when the detection result denotes that there is the defect on the picture, send a control instruction to a control device of the production node corresponding to the picture, to cause the control device to shunt the battery corresponding to the picture having the defect.

The battery detection device according to the present disclosure may be a hardware device such as a terminal device or a server, or may also be software installed on the hardware device. In some embodiments, the battery may be a single crystalline silicon solar cell. The detection for the battery may be the detection for some components of the battery, such as the detection for the EL component of the battery.

In the embodiment, the picture of the battery may be obtained by photographing the battery of each production node on the battery production line. Cameras may be set at multiple positions on each production node of the battery production line, to take the pictures of the batteries of each production node, and pictures of the batteries can be collected. The camera can be a fixed camera or a mobile camera.

In the embodiment, the defect type may be, for example, cracks, debris, empty solder, or broken gate. The defect detection model may be a deep neural network model, and the structure of the defect detection model may be determined according to the mask RCNN (Region Convolutional Neural Network) algorithm. In the embodiment, the structure of the defect detection model may include a convolution layer, a pooling layer, a fully connected layer, and the like. The convolution layer is configured to extract features in the picture, and generate a feature map corresponding to the picture. The pooling layer is configured to reduce the dimension of the feature map, remove non-main features in the feature map, and retain the main features in the feature map, and has high robustness to deformation, blurring, and illumination changes of the pictures on the production line.

The fully connected layer is a network branch based on instance segmentation. The branch is based on the feature map, and configured to restore the feature map to an original image size by using an algorithm based on binary interpolation. Each pixel is predicted to obtain its instance such as color, grayscale and other information, and then each object or component in the picture is obtained, and the object or component is compared with the object or component under normal conditions, so as to determine whether there is a defect in the picture, and determine the type and location of the defect when there is the defect.

Further, on the basis of the above embodiments, there may be a plurality of defect detection models, which are respectively set on different servers. Correspondingly, the detecting module 32 is further configured to: obtain a load of each of the plurality of defect detection models; select, from the plurality of defect detection models, a first defect detection model whose load satisfies a preset load condition; and input the picture into the first defect detection model to obtain the detection result output by the first defect detection model.

In the embodiment, compared with a single defect detection model, the setting of the plurality of defect detection models and the selecting of first defect detection model whose load satisfies the preset load condition from each of the plurality of defect detection models can reduce the workload of the defect detection model, and improve the detection speed of the pictures, thereby improving battery detection efficiency.

In the embodiment, the control device may be, for example, a conveyor belt, a robot arm, or a controller corresponding to the conveyor belt, the robot arm, or the like. In addition, in order to ensure the shunting effect of the battery corresponding to the picture having the defect, when the detection result denotes that there is the defect on the picture, a prompt message may be sent to the management personnel to prompt the management personnel to manually shunt the battery corresponding to the picture having the defect.

In addition, it should be noted that, the device may further include a generating module. The generating module is configured to generate a log according to the detection result and the shunt result, and store the log for the management personnel to view. The log may include pictures of each battery, picture collection time, detection results, and shunt results.

With the battery detection device according to embodiments of the present disclosure, the picture of each battery on the battery production line is obtained, the corresponding production node is obtained, the picture is input into the preset defect detection model, the detection result output by the defect detection model is obtained, the detection result includes whether there is the defect, the defect type and the defect position, and when the detection result denotes that there is the defect on the picture, the control instruction is sent to the control device of the production node corresponding to the picture, to cause the control device to shunt the battery corresponding to the picture having the defect based on the control instruction. Thus, by combining the defect detection model to identify the battery defects, both simple defects and complex defects can be identified, and the defect detection model is retrained based on the detection result, such that the defect detection model can identify the most recent defects, and the battery is automatically shunted according to the identified defects without manual participation, the efficiency and accuracy of battery detection are improved, and labor costs are reduced.

Figure 4:
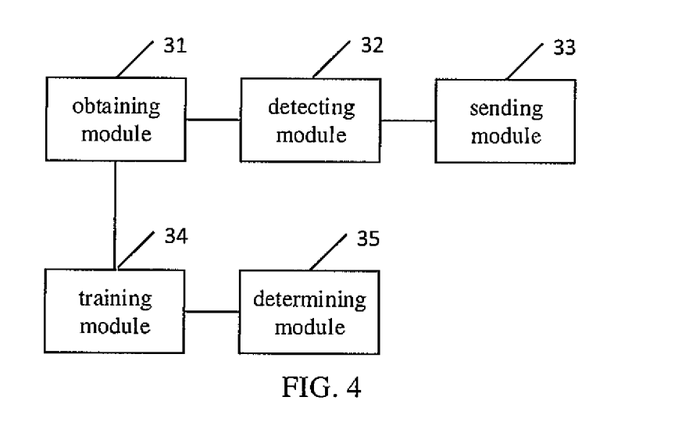
FIG. 4 is a block diagram of a battery detection device according to some other embodiments of the present disclosure.

Further, with reference to FIG. 4, on the basis of embodiments shown in FIG. 3, the device may further include a training module 34, and a determining module 35. The obtaining module 31 is further configured to obtain training data. The training data includes historical pictures of batteries on the production line and defect annotation results, and the defect annotation results includes the defect types and the defect positions. The training module 34 is configured to train an initial defect detection model according to the training data, until a preset loss function satisfies a corresponding condition. The determining module 35 is configured to determine the defect detection model trained as the preset defect detection model.

In the embodiment, the historical pictures may refer to historical pictures of the battery taken on the production line before the current time. The defect annotation results corresponding to the historical pictures may be results obtained by manually annotating the defect types and defect positions of the historical pictures.

Figure 5:
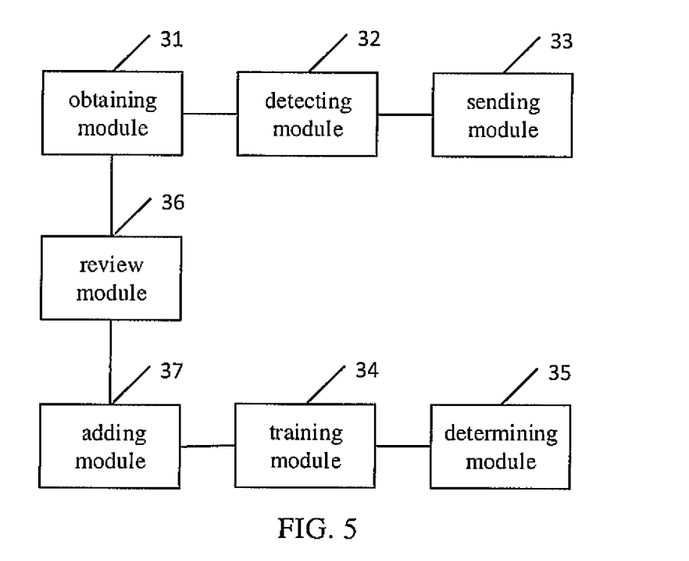
FIG. 5 is a block diagram of a battery detection device according to some other embodiments of the present disclosure.

Further, with reference to FIG. 5, on the basis of embodiments shown in FIG. 4, the device may further include a review module 36, and an adding module 37.

The review module 36 is configured to review the detection result corresponding to the picture. The adding module 37 is configured to add the picture and the detection result to the training data to obtain updated training data after the detection result passes the review. The training module 34 is further configured to retrain the defect detection model according to the updated training data.

In the embodiment, by retraining the defect detection model according to the picture and the detection result, the detection accuracy of the defect detection model can be improved, and when there is a new defect in the detection result, the defect detection model can also detect the new defect in the picture.

Further, on the basis of the above embodiments, the obtaining module 31 is further configured to obtain a number of pictures and corresponding detection results added into the updated training data. Correspondingly, the training module 34 is further configured to retrain the defect detection model according to the updated training data when the number is greater than a preset number threshold.

In the embodiment, in order to reduce the training times of the defect detection model, and avoid repeated training, re-training of the defect detection model may be started when the number of pictures and corresponding detection results newly added into the training data is greater than the preset number threshold.

Figure 6:
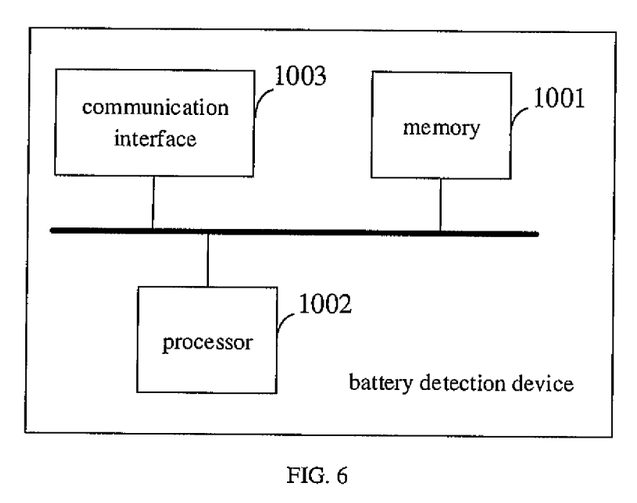
FIG. 6 is a block diagram of a battery detection device according to some other embodiments of the present disclosure.

FIG. 6 is a block diagram of a battery detection device according to some other embodiments of the present disclosure. The battery detection device includes a memory 1001, a processor 1002 and computer programs stored in the memory 1001 and executable by the processor 1002.

The processor 1002 is configured to perform the battery detection method according to the above embodiments.

Furthermore, the battery detection device further includes a communication interface 1003. The communication interface 1003 is configured for communication between the memory 1001 and the processor 1002.

The memory 1001 is configured to store computer programs executable by the processor 1002.

The memory 1001 may include a high-speed RAM memory, and may also include a non-volatile memory, such as at least one magnetic disk memory.

When programs are executed by the processor 1002, the processor 1002 is caused to implement the battery detection method described in the above embodiments.

When the memory 1001, the processor 1002 and the communication interface 1003 are independently implemented, the communication interface 1003, the memory 1001 and the processor 1002 may be connected to each other and communicate with each other through a bus. The bus may be an industry standard architecture (ISA) bus, a peripheral component (PCI) bus, or an extended industry standard architecture (EISA) bus, etc. The bus can be divided into an address bus, a data bus, a control bus, and the like. For ease of illustration, only one bold line is illustrated in FIG. 6, but it does not mean that there is only one bus or one type of bus.

In at least one embodiment, in an implementation, when the memory 1001, the processor 1002 and the communication interface 1003 are integrated on a chip, the memory 1001, the processor 1002 and the communication interface 1003 may communicate with each other through an internal interface.

The processor 1002 may be a central processing unit (CPU for short), an application specific integrated circuit (ASIC for short), or one or more integrated circuit configured to implement the embodiments of the present disclosure.

The present disclosure further provides a computer program product having stored thereon an instruction that, when executed by a processor, causes the battery detection method as described in any of the foregoing embodiments to be implemented.

The present disclosure further provides a non-transitory computer readable storage medium having stored thereon a computer program that, when executed by a processor, causes the battery detection method as described in any of the foregoing embodiments to be implemented.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

In addition, terms such as "first" and "second" are used herein for purposes of description and are not intended to indicate or imply relative importance or significance or to imply the number of indicated technical features. Thus, the feature defined with "first" and "second" may comprise at least one feature. In the description of the present disclosure, "a plurality of" means at least two, for example, two or three, unless specified otherwise.

Any procedure or method described in the flow charts or described in any other way herein may be understood to comprise one or more modules, portions or parts for storing executable codes that realize particular logic functions or procedures. Moreover, advantageous embodiments of the present disclosure comprise other implementations in which the order of execution is different from that which is depicted or discussed, including executing functions in a substantially simultaneous manner or in an opposite order according to the related functions, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be included.

In addition, individual functional units in the embodiments of the present disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The storage medium may be a read-only memory (ROM), a magnetic disk, an optical disk, or the like.

The described above are only preferred embodiments of the present disclosure. It should be noted that, for those of ordinary skilled in the art, several improvements and modifications can be made without departing from the principles of the present disclosure, and these improvements and modifications should also be in the protection scope of the present disclosure.

What is claimed is:

1. A battery detection method, comprising:
   obtaining a picture of each battery on a battery production line, and obtaining a corresponding production node, wherein a plurality of cameras are set at multiple positions on each of a plurality of production nodes of the battery production line to realize the battery detection for components of the battery during production;
   inputting the picture into a preset defect detection model, and obtaining a detection result output by the defect detection model, the detection result comprising: whether there is a defect, a defect type, and a defect position;
   when the detection result denotes that there is the defect on the picture, sending a control instruction to a control device of the production node corresponding to the picture, to cause the control device to shunt the battery corresponding to the picture having the defect based on the control instruction;
   wherein there are a plurality of defect detection models, and the plurality of defect detection models are respectively set on different servers,
   inputting the picture into the preset defect detection model and obtaining the detection result output by the defect detection model comprises:
   obtaining a load of each of the plurality of defect detection models;
   selecting, from the plurality of defect detection models, a first defect detection model whose load satisfies a preset load condition; and
   inputting the picture into the first defect detection model to obtain the detection result output by the first defect detection model.

2. The battery detection method of claim 1, wherein,
   the preset defect detection model is a deep neural network model; and
   a structure of the preset defect detection model is determined according to a mask Region Convolutional Neural Network RCNN algorithm.

3. The battery detection method of claim 1, wherein before inputting the picture into the preset defect detection model and obtaining the detection result output by the defect detection model, the battery detection method further comprises:
   obtaining training data, the training data comprising historical pictures of batteries on the production line and defect annotation results, and the defect annotation results comprising the defect types and the defect positions;
   training an initial defect detection model according to the training data, until a preset loss function satisfies a corresponding condition; and
   determining the defect detection model trained as the preset defect detection model.

4. The battery detection method of claim 3, wherein after inputting the picture into the preset defect detection model and obtaining the detection result output by the defect detection model, the battery detection method further comprises:

reviewing the detection result corresponding to the picture;

adding the picture and the detection result to the training data to obtain updated training data, after the detection result passes the review; and retraining the defect detection model according to the updated training data.

5. The battery detection method of claim 4, wherein before retraining the defect detection model according to the updated training data, the battery detection method further comprises:

obtaining a number of pictures and corresponding detection results added into the updated training data;

retraining the defect detection model according to the updated training data comprises:

retraining the defect detection model according to the updated training data when the number is greater than a preset number threshold.

6. A battery detection apparatus, comprising:

a memory;

a processor; and a computer program stored on the memory and executable by the processor, wherein when the computer program is executed by the processor, causes the processor to:

obtain a picture of each battery on a battery production line, and obtain a corresponding production node, wherein a plurality of cameras are set at multiple positions on each of a plurality of production nodes of the battery production line to realize the battery detection for components of the battery during production;

input the picture into a preset defect detection model, and obtain a detection result output by the defect detection model, the detection result comprising: whether there is a defect, a defect type, and a defect position;

when the detection result denotes that there is the defect on the picture, send a control instruction to a control device of the production node corresponding to the picture, to cause the control device to shunt the battery corresponding to the picture having the defect based on the control instructions;

wherein there are a plurality of defect detection models, and the plurality of defect detection models are respectively set on different servers, the processor is further configured to:

obtain a load of each of the plurality of defect detection models;

select, from the plurality of defect detection models, a first defect detection model whose load satisfies a preset load condition; and input the picture into the first defect detection model to obtain the detection result output by the first defect detection model.

7. A non-transitory computer-readable storage medium having stored thereon a computer program that, when executed by a processor, causes the processor to implement a battery detection method, the method comprising:

obtaining a picture of each battery on a battery production line, and obtaining a corresponding production node, wherein a plurality of cameras are set at multiple positions on each of a plurality of production nodes of the battery production line to realize the battery detection for components of the battery during production;

inputting the picture into a preset defect detection model, and obtaining a detection result output by the defect detection model, the detection result comprising: whether there is a defect, a defect type, and a defect position;

when the detection result denotes that there is the defect on the picture, sending a control instruction to a control device of the production node corresponding to the picture, to cause the control device to shunt the battery corresponding to the picture having the defect based on the control instruction;

wherein there are a plurality of defect detection models, and the plurality of defect detection models are respectively set on different servers, inputting the picture into the preset defect detection model and obtaining the detection result output by the defect detection model comprises:

obtaining a load of each of the plurality of defect detection models;

selecting, from the plurality of defect detection models, a first defect detection model whose load satisfies a preset load condition; and inputting the picture into the first defect detection model to obtain the detection result output by the first defect detection model.

8. The battery detection apparatus of claim 6, wherein, the preset defect detection model is a deep neural network model; and a structure of the preset defect detection model is determined according to a mask RCNN algorithm.

9. The battery detection apparatus of claim 6, wherein the processor is further configured to:

obtain training data, the training data comprising historical pictures of batteries on the production line and defect annotation results, and the defect annotation results comprising the defect types and the defect positions;

train an initial defect detection model according to the training data, until a preset loss function satisfies a corresponding condition; and determine the defect detection model trained as the preset defect detection model.

10. The battery detection apparatus of claim 9, wherein the processor is further configured to:

review the detection result corresponding to the picture;

add the picture and the detection result to the training data to obtain updated training data, after the detection result passes the review; and retrain the defect detection model according to the updated training data.

11. The battery detection apparatus of claim 10, wherein the processor is further configured to:

obtain a number of pictures and corresponding detection results added into the updated training data; and retrain the defect detection model according to the updated training data when the number is greater than a preset number threshold.

12. The non-transitory computer-readable storage medium of claim 7, wherein, the preset defect detection model is a deep neural network model; and a structure of the preset defect detection model is determined according to a mask RCNN algorithm.

13. The non-transitory computer-readable storage medium of claim 7, wherein before inputting the picture into the preset defect detection model and obtaining the detection result output by the defect detection model, the battery detection method further comprises:

obtaining training data, the training data comprising historical pictures of batteries on the production line and defect annotation results, and the defect annotation results comprising the defect types and the defect positions;

training an initial defect detection model according to the training data, until a preset loss function satisfies a corresponding condition; and determining the defect detection model trained as the preset defect detection model.

14. The non-transitory computer-readable storage medium of claim 13, wherein after inputting the picture into the preset defect detection model and obtaining the detection result output by the defect detection model, the battery detection method further comprises:

reviewing the detection result corresponding to the picture;

adding the picture and the detection result to the training data to obtain updated training data, after the detection result passes the review; and retraining the defect detection model according to the updated training data.

15. The non-transitory computer-readable storage medium of claim 14, wherein before retraining the defect detection model according to the updated training data, the battery detection method further comprises:

obtaining a number of pictures and corresponding detection results added into the updated training data;

retraining the defect detection model according to the updated training data comprises:

retraining the defect detection model according to the updated training data when the number is greater than a preset number threshold.

* * * * *